(12) United States Patent
Sinclair et al.

(10) Patent No.: US 9,479,547 B1
(45) Date of Patent: Oct. 25, 2016

(54) SYSTEMS AND METHODS FOR MULTI-PARTY MEDIA MANAGEMENT

(71) Applicant: RINGR, Inc., Mahomet, IL (US)

(72) Inventors: Timothy J. Sinclair, Mahomet, IL (US); Kris West, Halesworth (GB); Chad Olson, Mahomet, IL (US); Daniel Wright, Staunton, VA (US)

(73) Assignee: Ringr, Inc., Mahomet, IL (US)

( * ) Notice: Subject to any disclaimer, the term of this patent is extended or adjusted under 35 U.S.C. 154(b) by 0 days.

(21) Appl. No.: 15/096,626

(22) Filed: Apr. 12, 2016

Related U.S. Application Data

(60) Provisional application No. 62/146,637, filed on Apr. 13, 2015.

(51) Int. Cl.
*H04L 29/06* (2006.01)
*H04M 7/00* (2006.01)
*H04M 3/42* (2006.01)

(52) U.S. Cl.
CPC .......... *H04L 65/4007* (2013.01); *H04L 65/403* (2013.01); *H04L 65/601* (2013.01); *H04M 3/42221* (2013.01); *H04M 7/006* (2013.01)

(58) Field of Classification Search
CPC ............... H04L 29/06027; H04L 65/1069; H04L 65/1013; H04L 65/105; H04M 1/2473; H04M 3/2218
See application file for complete search history.

(56) References Cited

U.S. PATENT DOCUMENTS

| | | | |
|---|---|---|---|
| 7,054,420 B2 | 5/2006 | Barker et al. | |
| 7,548,539 B2 | 6/2009 | Kouretas et al. | |
| 8,422,641 B2 | 4/2013 | Martin, II | |
| 9,325,838 B2 * | 4/2016 | Assem | H04M 3/2227 |
| 2005/0140519 A1 | 6/2005 | Smith | |
| 2006/0023871 A1 | 2/2006 | Shaffer et al. | |
| 2007/0263788 A1 * | 11/2007 | Spohrer | H04L 29/12358 379/67.1 |
| 2008/0056241 A1 * | 3/2008 | Haddad | H04L 12/14 370/352 |
| 2009/0238377 A1 | 9/2009 | Ramakrishnan et al. | |
| 2010/0268534 A1 | 10/2010 | Kishan Thambiratnam et al. | |
| 2010/0286982 A1 | 11/2010 | Ramaswamy et al. | |
| 2013/0022189 A1 | 1/2013 | Ganong, III et al. | |
| 2015/0032797 A1 | 1/2015 | Pan | |

OTHER PUBLICATIONS

International Search Report, issued in International Application No. PCT/US2016/027257; dated Jul. 8, 2016, 3 pages in its entirety.
Written Opinion of the International Searching Authority, issued in International Application No. PCT/US2016/027257; dated Jul. 8, 2016, 9 pages in its entirety.

* cited by examiner

*Primary Examiner* — Jung Park
(74) *Attorney, Agent, or Firm* — Ulmer & Berne LLP

(57) ABSTRACT

Systems and methods for recording full quality audio and/or video from a plurality of parties, while also facilitating a real-time conversation or other interaction over low-bandwidth network links are provided. A voice over Internet protocol (VoIP) conversation, or other type of session, is facilitated between two or more parties using methods that reduce sound or video quality to achieve a low-latency connection. During the VoIP conversation, or other type of session, the audio and/or video from each party is recorded directly onto a storage medium of their respective device and stored as one or more data files. These data files can be generally unmodified, or merely lightly modified or compressed, resulting in a higher quality recording of the audio and/or video as compared to the audio and/or video that was transmitted to the other party during the session. The data files are then merged to create a final merged high-quality composite recording of the session.

16 Claims, 7 Drawing Sheets

SYSTEMS AND METHODS FOR MULTI-PARTY MEDIA MANAGEMENT

CROSS-REFERENCE TO RELATED APPLICATION

This application claims the benefit of U.S. provisional patent application Ser. No. 62/146,637, filed on Apr. 13, 2015, the disclosure of which is incorporated herein by reference in its entirety.

BACKGROUND

Conventional telephone systems and VoIP systems significantly reduce the quality of the transmitted audio. The reduction in quality can enable transmission over a low bandwidth connection. Typically, low-pass filtering and other compression techniques are utilized, both of which can significantly alter the quality of the audio. For example, traditional POTS telephone systems limit the frequency spectrum of transmitted audio to about the 350 Hz-3.3 kHz range. By comparison, the range of frequencies produced by human speech is generally about 60 Hz-14 khz. While some telephone systems do offer wide-band audio support that can increase the range of audio recorded to about 7 kHz, however, this increase still only covers around half of the frequency range of human speech. When audio transmitted through a conventional telephone system or VoIP system is recorded, the difference in the audio quality is detectable by an untrained ear.

BRIEF DESCRIPTION OF THE DRAWINGS

The foregoing and other features of exemplary embodiments of the present disclosure will become more fully apparent from the following drawings. Understanding that these drawings depict only several embodiments in accordance with the disclosure and, therefore, are not to be considered limiting of its scope, the disclosure will be described with additional specificity and detail through the use of the accompanying drawings.

DETAILED DESCRIPTION

Figure 1:
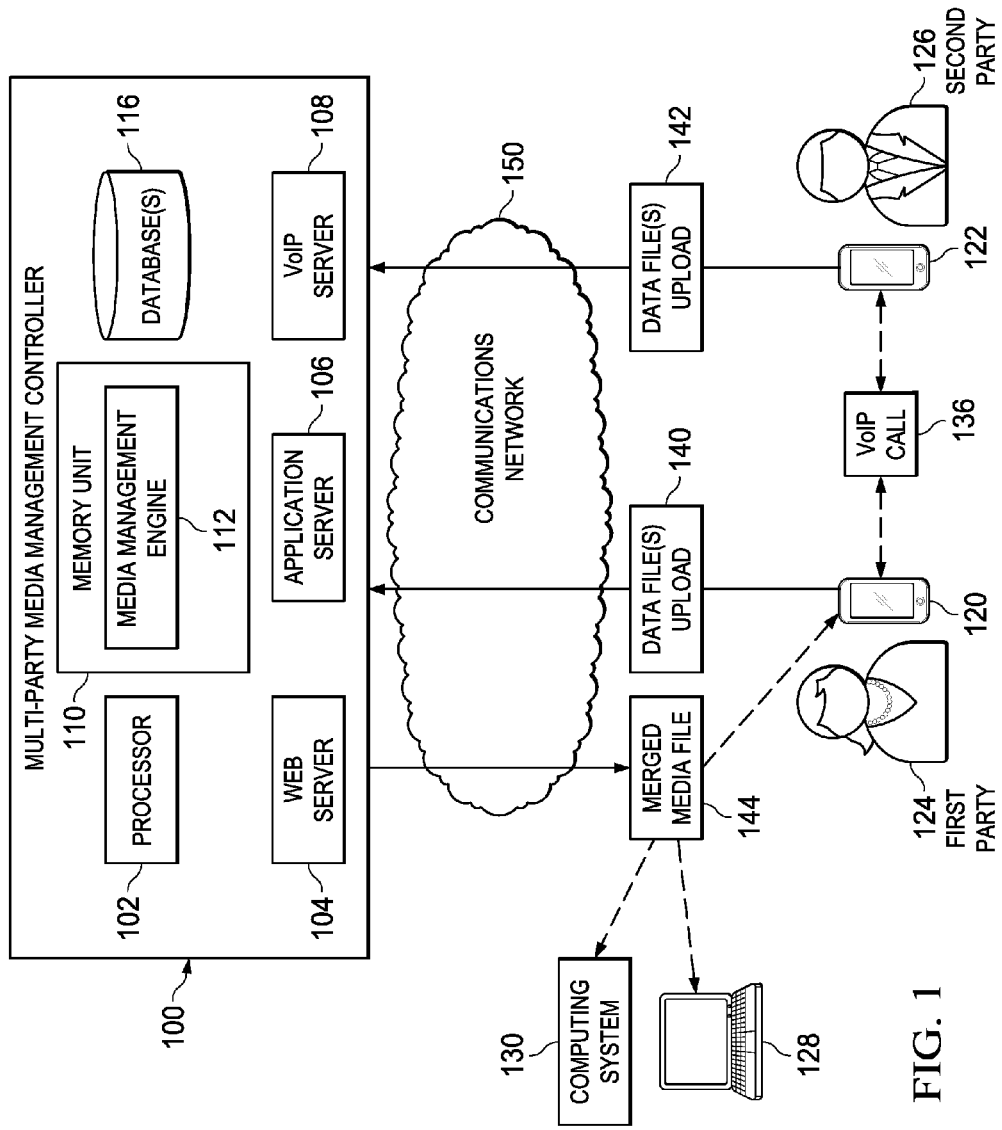
FIG. 1 depicts an example system diagram comprising a multi-party media management controller in accordance with one non-limiting embodiment.

Various non-limiting embodiments of the present disclosure will now be described to provide an overall understanding of the principles of the structure, function, and use of systems and methods disclosed herein for recording of high-quality, multi-party sessions over network links that do not have sufficient bandwidth to support such recording in real-time, including the majority of internet connections. One or more examples of these non-limiting embodiments are illustrated in the selected examples disclosed and described in detail with reference made to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "some exemplary embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

The present disclosure is generally directed to systems and methods for recording of full quality audio and/or video from a plurality of parties, while also facilitating a real-time conversation or other interaction over low-bandwidth network links. As described in more detail below, in some embodiments, a VoIP conversation can be facilitated between two or more parties using conventional methods that may reduce sound quality to achieve a low-latency audio connection via a device such as a smart phone or computer per party. During the VoIP conversation, or other type of session, the audio and/or video from each party can be recorded directly onto a storage medium of their respective device and stored as one or more data files. These records can be generally unmodified, or merely lightly modified or compressed, resulting in a higher quality recording of the audio and/or video as compared to the audio and/or video that was transmitted to the other party during the session.

As described in more detail below, timing information for each party's recording function can also be maintained to facilitate the eventual alignment and merging by a multi-party media management controller of the plurality of recordings associated with a session. The data file(s) created by each party's device can be uploaded to a multi-party media management controller after the session ends, or at any other suitable time, such as at intervals during the session. The multi-party media management controller can then process the two or more separate data files to produce a final merged high-quality composite recording of the session. This merged media file can then be made available to any suitable recipient, such as one or more of the parties, or any other person or entity. In some embodiments, the merged media file can be downloaded to a computing device or otherwise transferred through a suitable transfer mechanism. While the systems and methods described herein can be applicable to real-time recording and subsequent merging of multi-media elements (i.e., audio and video), various examples are described herein in the context of audio-only based systems merely for the purposes of explanation. Such examples are not intended to be limiting.

Referring now to FIG. 1, which depicts an example system diagram comprising a multi-party media management controller 100, the multi-party media management controller 100 can be in communication with one or more communications networks 150. The multi-party media management controller 100 can be provided using any suitable processor-based device or system, such as a personal computer, laptop, server, mainframe, other processor-based device, or a collection (e.g. network) of multiple computers, for example. In some embodiments, the multi-party media management controller 100 can generally be a cloud-based service available to a plurality of users through various communication networks.

The multi-party media management controller 100 can include one or more processors and one or more memory units. For convenience, only one processor 102 and only one memory unit 110 are shown in FIG. 1. The processor 102 can execute software instructions stored on the memory unit 110. The processor 102 can be implemented as an integrated circuit (IC) having one or multiple cores. The memory unit 110 can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs.

The memory unit 110 can store executable software and data for a media management engine 112. When the processor 102 of the multi-party media management controller 100 executes the software instructions of the media management engine 112, the processor 102 can be caused to perform the various operations of the multi-party media management controller 100. The various operations of the multi-party media management controller 100 can include, but are not limited to, the following: create and maintain user accounts, schedule and host session, determine recording timing data, receive uploaded data files from numerous user computing devices, determine media alignments, process and merge uploaded data files; and provide merged media files to recipients, as well as perform other operations as discussed in more detail below.

The media management engine 112 can use data from various sources, including, but not limited to, one or more databases 116. The data stored in the databases 116 can be stored in a non-volatile computer memory, such as a hard disk drive, read only memory (e.g. a ROM IC), or other types of non-volatile memory. In some embodiments, one or more of the databases 116 can be stored on a remote electronic computer system and can be accessed by the multi-party media management controller 100 via the communications network 150. As one having ordinary skill in the art would appreciate, a variety of other databases or other types of memory storage structures (such as those illustrated in FIG. 2) can be utilized or otherwise associated with the multi-party media management controller 100.

Also shown in FIG. 1, the multi-party media management controller 100 can include one or more computer servers, which can include one or more web servers, one or more application servers, and/or one or more other types of servers, such as VoIP servers (i.e., an internet-based telephone system). For convenience, only one web server 104, one application server 106, and one VoIP server 108 are depicted in FIG. 1, although one having ordinary skill in the art would appreciate that the disclosure is not so limited. Further, while VoIP server 108 is schematically depicted as being a component of the multi-party media management controller 100, in some embodiments, the VoIP server 108 can be provided by a separate system. In any event, the servers 104, 106, 108 can cause content to be sent to first and second party communication devices 120, 122, described in more detail below, via the communication network 150 in any of a number of formats, which can include, but are not limited to, phone calls, text-based messages, multimedia messages, email messages, smart phone notifications, web pages, and other message formats. The servers 104, 106, 108 can be comprised of processors (e.g. CPUs), memory units (e.g. RAM, ROM), non-volatile storage systems (e.g. hard disk drive systems), and other elements. The servers 104, 106, 108 may utilize one or more operating systems including, but not limited to, Solaris, Linux, Windows Server, or other server operating systems.

In some embodiments, the web server 104 can provide a graphical web user interface through which various users can interact with the multi-party media management controller 100. The graphical web user interface can also be referred to as a graphical user interface, client portal, client interface, graphical client interface, and so forth. The web server 104 can accept requests, such as HTTP requests, from various entities, including but not limited to first entities, second entities, and third entities, and serve responses to those entities, such as HTTP responses, along with optional data content, such as web pages (e.g. HTML documents) and linked objects (such as images, video, and so forth). The application server 106 can provide a user interface for users who do not communicate with the multi-party media management controller 100 using a web browser. Such users can have special software installed on their communication device to allow the user to communicate with the application server 106 via the communication network 150.

The multi-party media management controller 100 can be in communication with a plurality of communication devices via the communications network 150. For convenience, only first and second party communication devices 120, 122 are schematically depicted in FIG. 1. The network 150 can be an electronic communications network and can include, but is not limited to, the Internet, LANs, WANs, GPRS networks, other networks, or combinations thereof. The network 150 can include wired, wireless, fiber optic, other connections, or combinations thereof. In general, the communications network 150 can be any combination of connections and protocols that will support communications between the multi-party media management controller 100 and the first and second party communication devices 120, 122 and/or other devices and systems 128, 130, as described in more detail below. Data communicated via the communications network 150 can be of various formats and can include, for example, textual, visual, audio, written language, other formats or combinations thereof. The data communicated via the communications network 150 can be in the form of files containing data in any of the aforementioned formats and can be uploaded to or downloaded from the multi-party media management controller 100. The nature of data communicated via the communications network 150 will be discussed in further detail in association with other exemplary embodiments.

As shown by the exemplary embodiment in FIG. 1, a first party 124 can be associated with one or more first party communication devices 120 and a second party 126 can be associated with one or more second party communication devices 122. Each of the communication devices 120, 122 can be any type of computer device suitable for communication over the network 150 and having recording capabilities and storage capabilities. The first party communication device 120 and/or the second party communication device 122 can be any of, for example, a laptop computer (which also includes a netbook or other portable computing device), a desktop computer, a tablet computer, a personal digital assistant (PDA), a smartphone (combination telephone and handheld computer), or other suitable mobile communications device (such as a networked gaming device, a media player, for example). In some embodiments, any of the communication devices 120, 122 can be a wearable computing device. Examples of wearable computing devices include devices that incorporate an augmented reality head-mounted display as well as other computing devices that can be worn on the body of the user, such as worn on the wrist.

In some embodiments similar to the exemplary embodiment in FIG. 1, a first party 124 and a second party 126 can each install special software on their respective communication devices 120, 122 to allow the first and second parties 124, 126 to communicate with the application server 106 via the communication network 150. The software for the communication devices 120, 122 can be downloaded to the communication device via the communication network 150 or installed through other techniques known in the art. In some embodiments, the software may be downloaded from the multi-party media management controller 100. In some embodiments, the software can be an app that is available from the Apple™ iStore™, or another app store, for downloading onto and executing on an Apple™ iPhone™, or iPAd™.

In some embodiments, one or both of the communication devices 120, 122 can provide a variety of applications for allowing the respective first and second parties 124, 126 to accomplish one or more specific tasks using the multi-party media management controller 100. Applications can include, for example, a web browser application (e.g. INTERNET EXPLORER, MOZILLA, FIREFOX, SAFARI, OPERA, GOOGLE CHROME, and others), telephone application (e.g. cellular, VoIP, PTT, and others), networking application, messaging application (e.g. e-mail, IM, SMS, MMS, BLACKBERRY Messenger, and others), and so forth. The communication devices 120, 122 can include various software programs such as system programs and applications to provide computing capabilities in accordance with the described embodiments. System programs can include, but are not limited to, an operating system (OS), device drivers, programming tools, utility programs, software libraries, application programming interfaces (APIs), and so forth. Exemplary operating systems can include, for example, a PALM OS, MICROSOFT WINDOWS, OS X, iOS, ANDROID OS, UNIX OS, LINUX OS, SYMBIAN OS, EMBEDIX OS, Binary Runtime Environment for Wireless (BREW) OS, Java OS, a Wireless Application Protocol (WAP) OS, and others.

The communication devices 120, 122 can include various components for interacting with the multi-party media management controller 100, such as a display or a keypad/keyboard for inputting data and/or commands. The communication devices 120, 122 can include other components for use with one or more applications such as a stylus, a touch-sensitive screen, keys (e.g. input keys, present and programmable hot keys), buttons (e.g. action buttons, a multi-directional navigations button, preset and programmable shortcut buttons), switches, a microphone, camera, speakers, an audio headset, and so forth.

In the illustrated embodiment, the first party 124 can function as an originating party and interacts with the multi-party media management controller 100 via a variety of other electronic communications techniques, including, but not limited to, HTTP requests, API calls, and the like. The first party 124 can, for example, create an account with the multi-party media management controller 100 and then setup a session with any number of participants, such as second party 124 and/or others. Generally, the session is to be recorded locally by the communication devices 120, 122 and then processed and merged by the multi-party media management controller 100, as described in more detail below.

The multi-party media management controller 100 can facilitate the setup of a session with the second party 126 and/or additional parties via any number of routes including, but not limited to, email invites, SMS invites, social media notifications, push notifications (for example via in-app push notification services offered by APPLE® and/or the messaging systems offered by GOOGLE® cloud) or any other appropriate communication techniques. The invitation can include, for example, instructions on where to retrieve and install software that may be required to facilitate and record the session as well as information that may be required to join the session (such as an invite code, host code, account name, and so forth). The invitation can also contain a proposed time/date for the session to be conducted, or the invitation can be for a session that is to commence immediately or in the very near future. Leading up to the scheduled session, reminders can be issued via mechanisms similar to those used to issue the invites.

Each first and second party 124, 126 can join the session at the designated time/date. As each person enters the session the software resident on their communication devices 120, 122 can be provided with the access details for a VoIP connection via a Session Initiation Protocol (SIP) server (i.e., the VoIP server 108) and each can be asked to wait while the other parties join. Once all parties are ready the multi-party media management controller 100 can record the start time of the session (i.e., using its own clock) and issue a START signal to each communication device 120, 122. When received, each party's communication device 120, 122 can record the time the signal was received (i.e., using its own clock), begin a visible countdown displayed on a display screen of the respective communication device 120, 122 (i.e., 3 seconds, to allow each party to receive the start signal and to prepare themselves for the session to begin) and then join the VoIP call. The communication devices 120, 122 can each start recording the local party's audio such that the first communication device 120 records the audio of the first party 124 and the second communication device 122 records the audio of the second party 126.

The communication devices 120, 122 can also each issue a response to the START signal confirming to the multi-party media management controller 100 the start of recording. In order to aid in the post-session merging of the recordings, in some embodiments, the response can also include a number of milliseconds between receipt of the START signal and the actual start of recording, which can be referred to as the "start_delay," as tracked and logged by each of the communication devices 120, 122. When the START response is received by the server for each communication devices 120, 122, multi-party media management controller 100 can calculate and record the total roundtrip time by subtracting the time that it sent the START signal from the time at which it received the response, referred to as the "rtt_delay." The start_delay and rtt_delay values for each participant can later be used to align the separate recordings to produce a merged recording, as described in more detail below. In some embodiment, the values can be refined by further SYNC signals issued by the multi-party media management controller 100 which can be handled in a similar fashion to the START signal, except that they can also contain additional synchronization metrics, such as the number of milliseconds since recording started, in order to refine the estimate of the start time of recording on each device.

Once the call has started, the first and second parties 124, 126 (and any other parties that may be participating on the call via their own respective communication devices) can converse as normal over a VoIP connection 136. Simultaneously the audio for each of the first and second parties 124, 126 can be recorded locally on their respective communication devices 120, 122. In some embodiments, the recorded audio on each device can generally contain no crosstalk or any evidence of the other participants, as it can be purely a recording of the input to the microphone at the respective communication device 120, 122, rather than a recording of the VoIP conversation. When the session is complete the originating party may stop the session and a STOP signal can be issued to all parties by the multi-party media management controller 100 at which point the software will disconnect from the VoIP call immediately. As noted above, while this embodiment is described in the context of an audio recording, it is to be readily appreciated that similar techniques can be used to locally record video locally at each of the respective communication devices 120, 122 using analogous techniques.

On disconnection from the VoIP call 136, or otherwise in response to a stop command or other event (i.e. local memory storage is full), each participant's communication device 120, 122 can cease recording and prepare to transmit the high-quality recorded audio (or video, as may be the case) to the multi-party media management controller 100 for processing. It is noted that prior to transmission to the multi-party media management controller 100 some relatively limited processing maybe performed on the data, such as encoding the audio to reduce its storage size. The processing performed can have an emphasis on retaining a relatively high quality. Additionally, in some cases, chunking/partitioning can be used to facilitate the upload of smaller portions of the recording at a time, making the upload more robust to transmission issues and connection drops. In any event, each communication devices 120, 122 can eventually upload the data files 140, 142 that contain the recorded audio to the multi-party media management controller 100. A readout of the progress of each party's upload (number of chunks completed vs. total chunks to upload) can be made available to one or more of the parties 124, 126. Should any communication devices 120, 122 fail to upload their data file(s), reminder notifications can be issued using the same mechanisms as those used to invite each participant.

Once the high-quality audio (or other media files) from each communication devices 120, 122 has been uploaded to the multi-party media management controller 100, the audio files can be aligned and merged to form a composite media file containing the audio from each of the first and second parties 124, 126. The start_delay and rtt_delay values for each of the communication devices 120, 122 can be used to calculate how the period of time it took for the communication device to start recording after the START signal was issued by the multi-party media management controller 100. In one embodiment, the recording delay for each communication device can be determined using the equation 1:

$$((rtt\_delay-start\_delay)/2)+start\_delay=recording\_delay \qquad \text{EQ. 1}$$

As stated above, in some embodiments, these values can be refined through additional measurements made in response to SYNC calls from the multi-party media management controller 100. The communication device with the smallest calculated recording_delay can be determined to be the first communication device that began recording and all other recordings received by the multi-party media management controller 100 associated with that session can be "padded" at the beginning of with a number of milliseconds of silence or dead space. The amount of padding can generally be equal to the difference between the recording_delay for that particular communication device and the lowest recording_delay value, in order to align the recordings when combined into a composite media file.

While the approach described above is one technique to align recordings, additional or alternative alignment techniques can be used without departing from the scope of the current disclosure. For example, synchronization of clocks on each communication device involved in a session can be utilized, for example by using a Network Time Protocol (NTP) server, or direct analysis of all the received recordings to determine the alignment where the where the audio overlaps the least, i.e. when the least number of participants are talking at any time. In some embodiments, more than one technique can be used to facilitate alignment of the data files received from a plurality of communication devices. Additionally, in accordance some embodiments, prior to merging the plurality of separate audio files, volume levels of each recording can be normalized using a procedure based on perceived loudness, in order to produce a merged media file in which each participant appears to be speaking at roughly the same volume. As is to be appreciated, other suitable forms of equalization and processing can be applied to the data files either prior or post merging in an effort to improve the overall quality of the audio files.

Once aligned, the recordings can be merged by the multi-party media management controller 100 to produce one or more output versions of the session as merged media file(s) 144. In some embodiments, for example, the output versions can include any of a composite audio file containing audio from all participants and/or the aligned (padded) audio from a single participant. In some implementations, the multi-party media management controller 100 can additionally or alternatively return the aligned audio from each communication devices 120, 122, a single channel (mono) version of the combined audio and a multi-channel (stereo for two participants) version of the combined audio, with one participant per audio channel. The merged recordings may be encoded in a suitable lossy or lossless audio codec, or maintained in raw form (i.e., as a WAV file). The merged recordings, depicted as merged media file 144 in FIG. 1, can be provided to any number of suitable receiving entities, such as the first communication devices 120 of the first party 124, or any other entity, as shown by receiving entities 128, 130. This access maybe provided via any suitable file transfer mechanism.

In some embodiments, either of the first or second parties 124, 126, or other entity, can request alternative versions of the merged recording including, but not limited to: alternative encodings and encoding qualities, versions processed with noise removal techniques (which may be applied to each individual recording more effectively than to the merged recording), versions with a single or dynamically varying gain adjustment applied manually or via an automated procedure for each participant, versions with a varying manual gain adjustment (including muting of sections) for each participant or versions with other added audio effects or sound effects manually or automatically applied.

Figure 2:
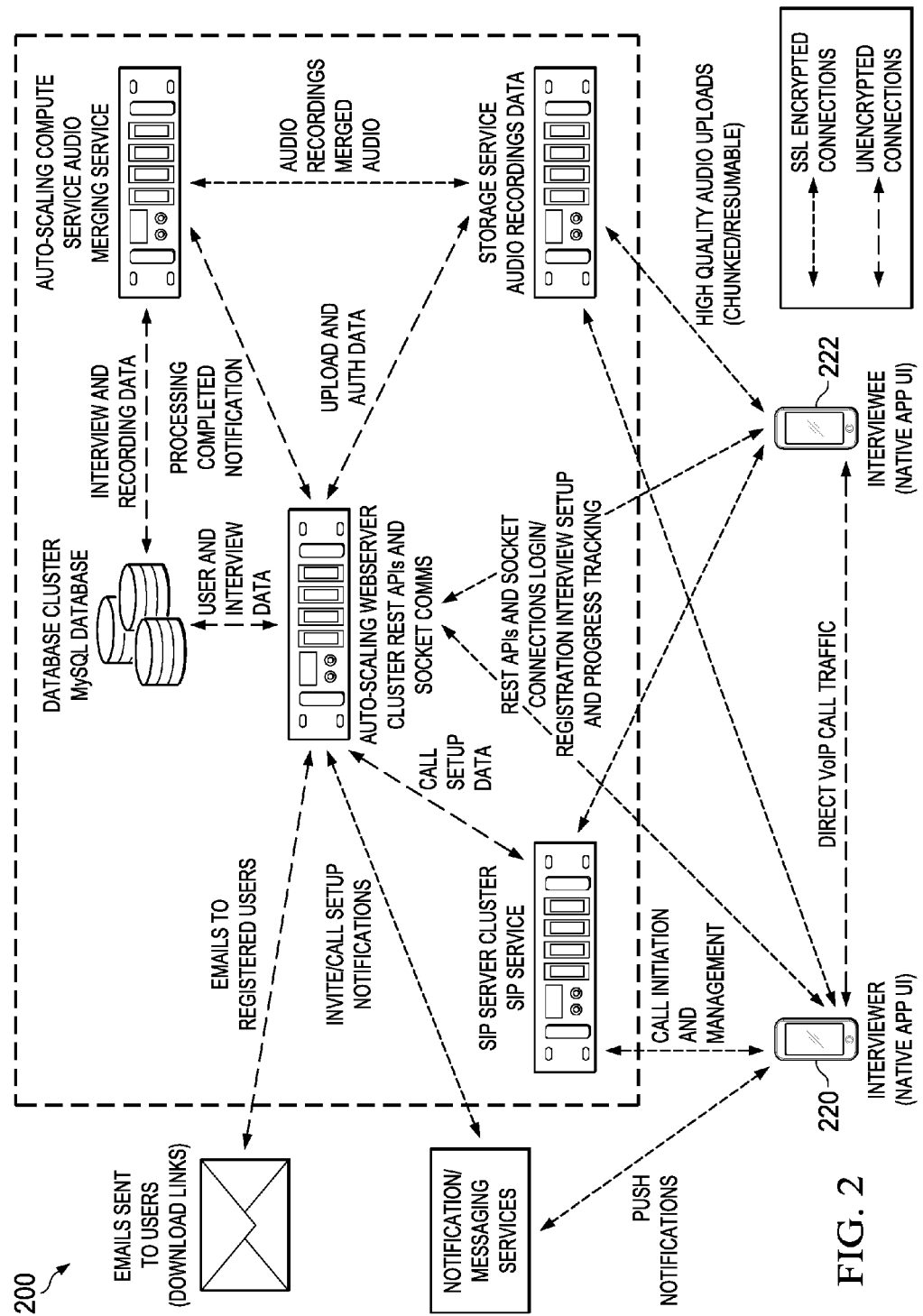
FIG. 2 depicts another system diagram of an example comprising a multi-party media management controller in communication with communication devices in accordance with one non-limiting embodiment.

FIG. 2 depicts another system diagram of an example multi-party media management controller 200. The multi-party media management controller 200 can be in communication with a plurality of communication devices. For convenience, only two communication devices (communication devices 220 and 222) are depicted in FIG. 2. The communication device 220 is schematically depicted as being operated by an "interviewer" and the communication device 222 is schematically depicted as being operated by an "interviewee." For example, the interviewer may be interviewing the interviewee via a VoIP call for the purposes of a radio interview, a job interview, a podcast interview, a news interview, or any other type of interview or conversation. As it to be readily appreciated, however, while FIG. 2 depicts an interviewer/interviewee scenario for pedagogical purposes, the illustrated system can be utilized for a wide range of operational scenarios and is not intended to be limited to any particular use case.

Similar to the system described in FIG. 1, the multi-party media management controller 200 can be utilized to setup user accounts and schedule a VoIP call between the communication devices 220, 222. In this regard, notifications and/or emails can be dispatched by the multi-party media management controller 200 to the interviewer and interviewee. A SIP server can be utilized to initiate and manage the VoIP call between the communication devices 220, 222. The communication devices 220, 222 can each record audio content locally into a storage medium and eventually upload the audio files to a storage service of the multi-party media management controller 200. The received audio files can then be merged by the multi-party media management controller 200 and stored in a database for transfer to one or more recipients.

Figure 3:
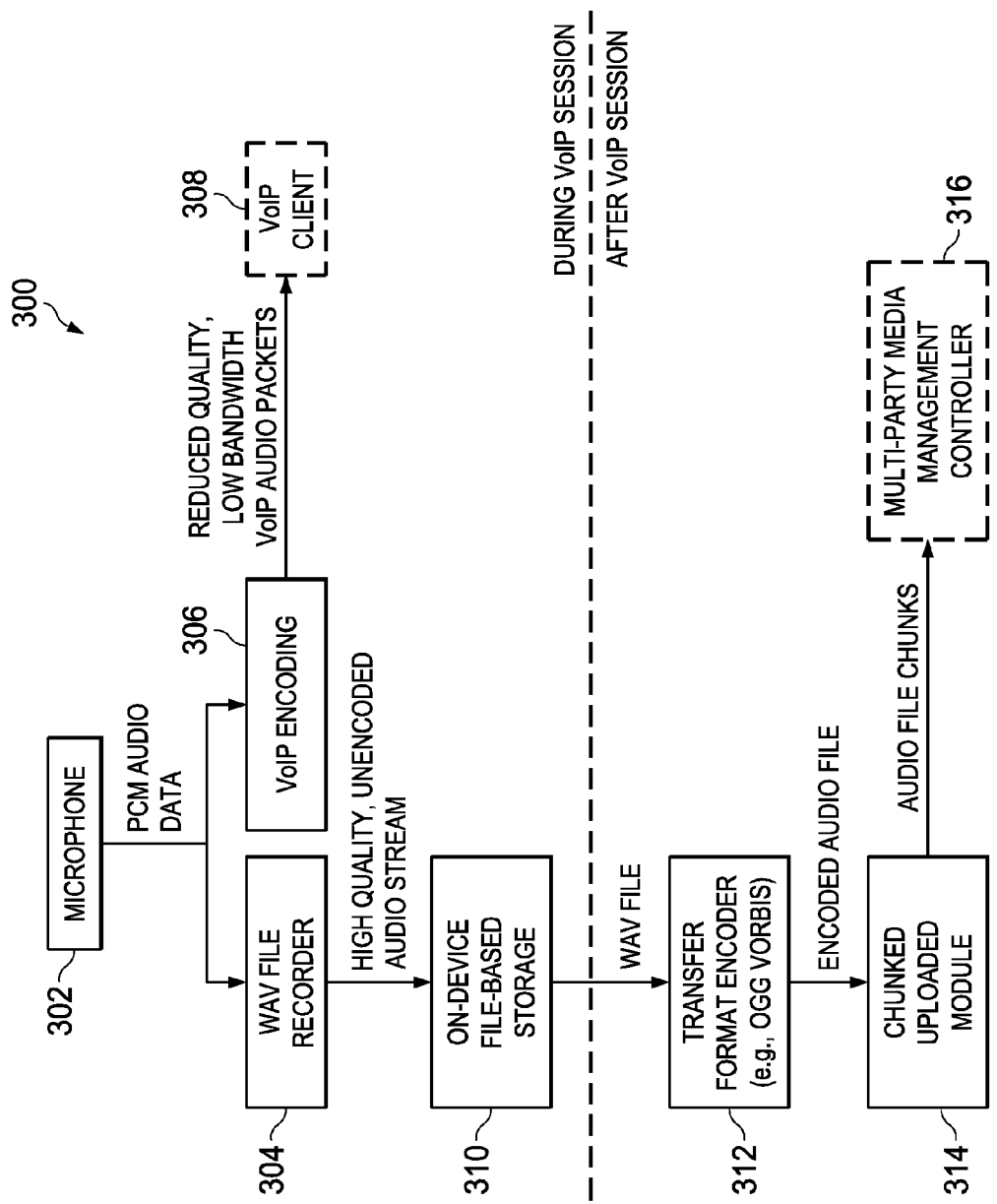
FIG. 3 depicts an example system and flow diagram of a communication device interacting with a multi-party media management controller in accordance with one non-limiting embodiment.

FIG. 3 depicts an example system and flow diagram of a communication device 300 interacting with a multi-party media management controller 316 during a VoIP session and after a VoIP session. Audio is received from a user via a microphone 302 of the communication device 300. The pulse-code modulated (PCM) audio can generally be subjected to two different processing events. First, the PCM audio can processed using VoIP encoding 306 to prepare the audio for transferring via VoIP to a recipient. The VoIP encoding 306 can generally produce reduced quality, low bandwidth VoIP audio packets that are suitable for transmission using a VoIP client 308. Second, The PCM audio can also be locally processed via an onboard file recorder, such as a WAV file recorder 304. The audio can be recorded, however, in any suitable file type, as be available on the communication device 300, such as a RAW file format or AIFF file format. In any event, the audio that is recorded into the on-device file-based storage 310 can be of a higher quality than the audio sent to the VoIP client 308.

After the VoIP session, or in some cases, during the VoIP session, the communication device 300 can prepare the audio file for transfer. In the illustrated embodiment, light encoding is applied to the file using an encoder 312. In one embodiment, a VORBIS codec is utilized to generate an OGG file, although this disclosure is not so limited. The encoded audio file can then optionally be chunked or otherwise partitioned using a chunked upload module 314. Chunking/partitioning the encoded audio file can be helpful to upload of smaller portions of the encoded audio file, making the upload process more robust to transmission issues and connection drops. The audio file chunks can then be uploaded to a multi-party media management controller 316.

Figure 4:
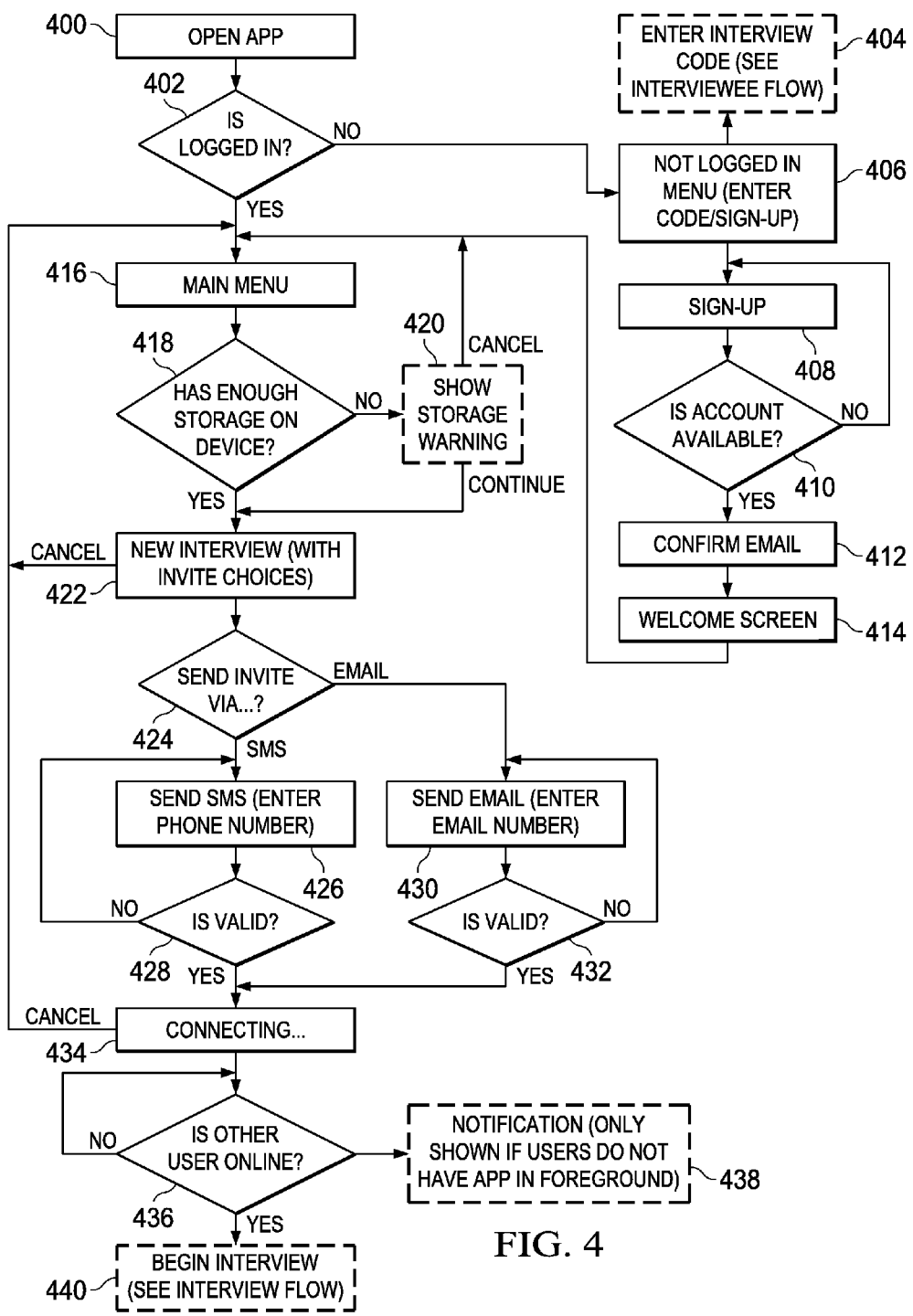
FIG. 4 depicts an example process flow for a communication device of a session originator in accordance with one non-limiting embodiment.
Figure 5:
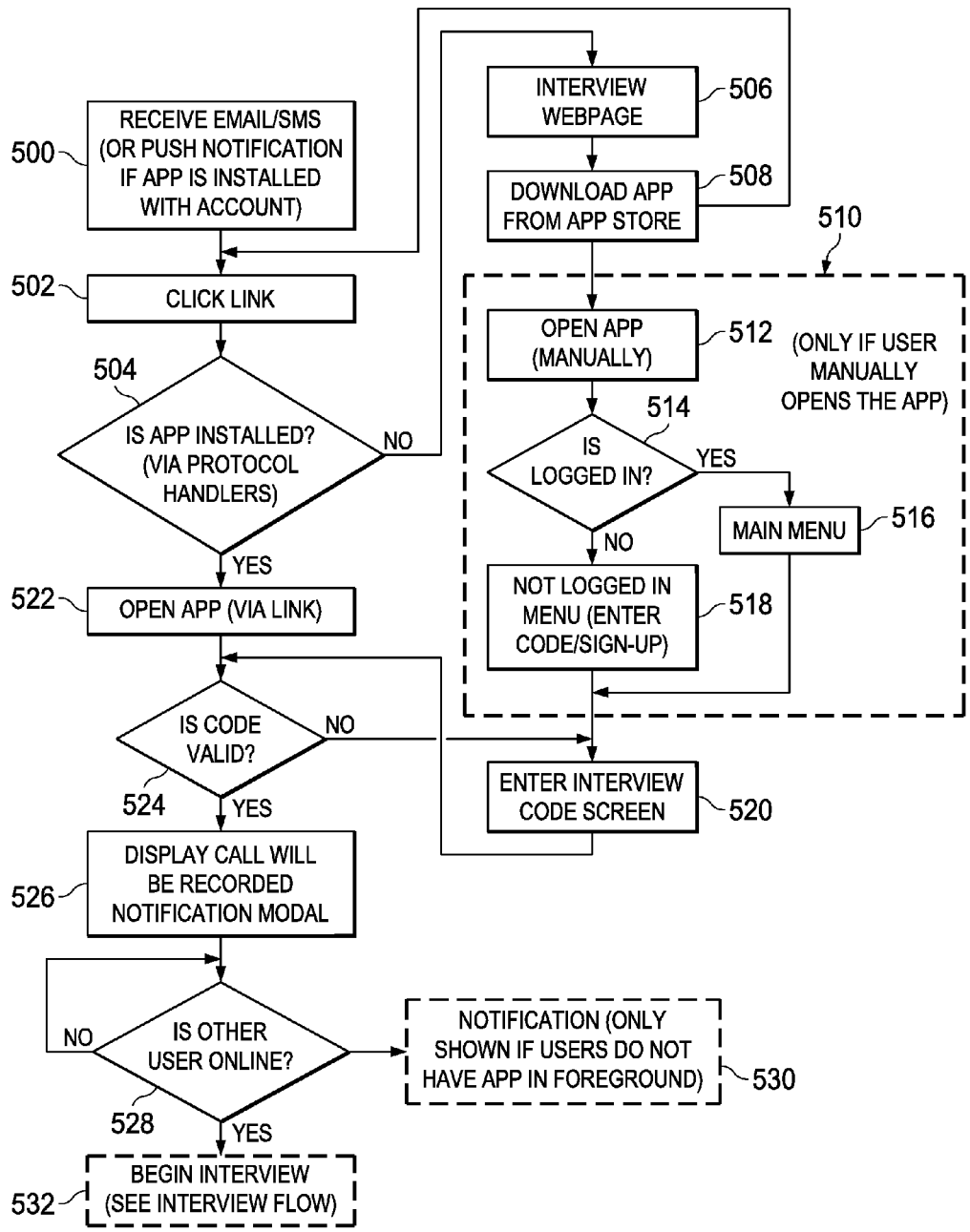
FIG. 5 depicts an example process flow for a communication device of an invited participant in a session in accordance with one non-limiting embodiment.
Figure 6:
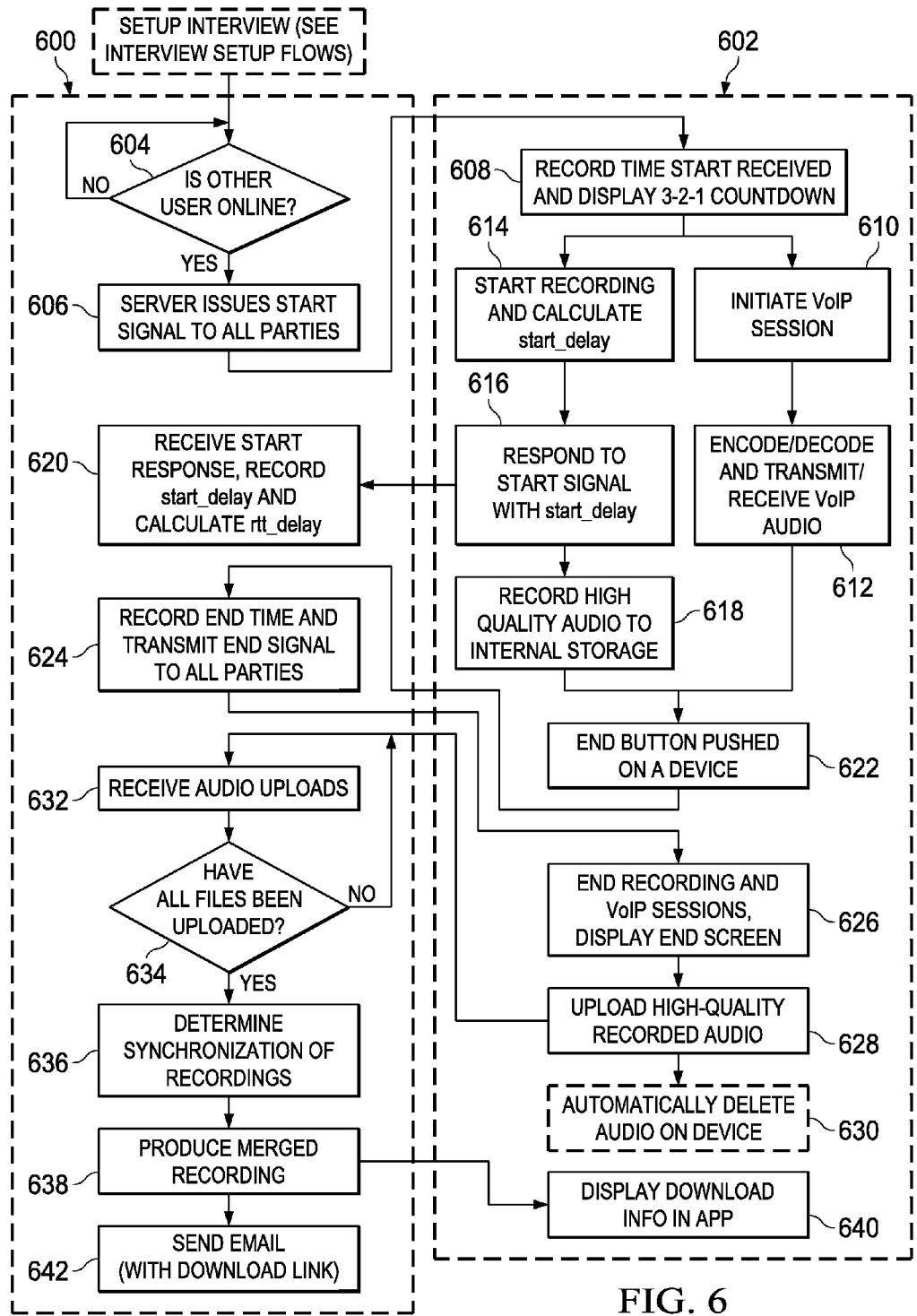
FIG. 6 depicts the process flow of a session on both a multi-party media management controller and a communication device participating in the session in accordance with one non-limiting embodiment.

FIGS. 4-6 depict example process flows in accordance with various non-limiting embodiments. In particular, FIG. 4 depicts an example process flow for a communication device of a session originator (such as communication device 120, 220, or 300, for example). FIG. 5 depicts an example process flow for a communication device of a participant invited to a session (such as communication device 122, 222, or 300, for example). The process flows depicted in FIGS. 4 and 5 both flow into the process flow depicted in FIG. 6, which schematically depicts the process flow of a session on both a multi-party media management controller and a communication device participating in the session. While FIGS. 4-6 generally depict the process flow for a session involving two participants, it is to be appreciated that similar process flows can be used for sessions involves three or more participants.

Referring first to FIG. 4, at 400, the application on the communication device is opened by the session originator. At 402, it is determined if the originator is logged in to the system. If not, the originator is directed to a menu 406 where various inputs can be supplied, such as a session code or account information. If a session code is entered, at 404, the originator can begin the process flow as a participant, as shown in FIG. 5. Still referring to FIG. 4, if account information is entered, a sign-up sequence 408 can be initiated, such as by entering a user name and email address and/or other identifying information. At 410, it can be determined if the account is available, and if so, a confirmation email can be sent at 412 to validate the account and the originator can be presented with a welcome screen 414.

If the user is logged in, or subsequent to creating a new account, a main menu 416 can be presented. The communication device can also check the available local storage at 418. If insufficient storage space is available, a storage warning 420 can be provided to the user. In some embodiments, the total session length available for storage can be presented to the user based on available storage metrics.

At 422, a new session code is generated (schematically depicted as an "interview code") and invitation delivery techniques are presented to the originator. At 424, it is determined which invitation delivery selection technique(s) was selected by the originator. At 426, if SMS was selected, a phone number for the recipient is received and an invitation is sent via text message. At 430, if email was selected, an email address for the recipient is received and an invitation is sent via email. As is to be appreciated, other forms of notification and invitation can be utilized, such as in-app messages, push notifications, social media notifications, and so forth. The invitations can be sent from the multi-party media management controller coordinating the session or any other suitable entity. At 434, the communication device is connected to a VoIP session. At 436, it is determined if the invited user has joined the session. In some embodiments, at 438, a notification can be provided to the originator if the invited user is not executing the proper application. Once the other user has connected, at 440, the session begins.

Referring now to FIG. 5, at 500, the invited user receives the invitation. The invitation can be received via any suitable medium, such as an inbound text message, email, or other communication. Additionally or alternatively, the invitation can be presented as an in-app message or notification. The invitation can include a hyperlink that the user can activate, as indicated at 502. At 504, it can be determined if the invited user has installed the application on the communication device. If not, the invited user can be directed to a webpage 506 describing the system and eventually to an online application repository 508 for the downloading of the application. Once downloaded, as indicated by process 510, the invited user can create an account. At 512, the downloaded application can be opened. At 514 it is determined if the invited user is logged in. If yes, a main menu 516 is presented. If no, the invited user can be prompted to enter an invitation code and/or sign-up for an account. At 520, a code is entered (or is otherwise prepopulated) to link the invited user to a particular session. Referring again to the opening sequence, if it is determined at 504 that the application is installed on the communication device of the invited user, the application can be opened locally on the communication device 522 when the invited user activates the link.

At 524, it is determined if the code is valid and then various privacy notifications can be presented to the invited user at 526. At 528, it is determined if the originating user has joined the session. In some embodiments, at 530, a notification can be provided to the invited user if the originating user is not executing the proper application. Once the other user or user(s) have connected, at 532, the session begins.

Referring now to FIG. 6, the process flow for a multi-party media management controller 600 and the process flow for each communication device 602 participating in a session are depicted. At 604, it is determined by the multi-party media management controller 600 if all participants are online. If yes, at 606 a START signal can be issued to each of the communication devices. For simplicity, FIG. 6 only depicts a START signal being issued to a single communication 602. At 608, the communication device 602 records the time the START signal was received and a countdown to session commencement can be displayed on a display screen to the user.

When the session commences, two audio-based processes can be started. First, at 610, a VoIP session can be initiated and encoded/decoded audio can be transmitted/received at 612. Second, at 614 the recording of the audio (and, in some cases, video) can be initiated and the start_delay can be calculated based on the amount of time that transpired between the receipt of the START signal and the commencement of recording.

At 616, the communication device 602 can respond to the multi-party media management controller 600 with the start_delay. At 618 relatively high quality audio can be recorded locally on the communication device 602 during session. At 620, the multi-party media management controller 600 can receive the START response and start_delay from the communication device 602 and the other communication devices involved in the session. The multi-party media management controller 600 can then calculate rrt_delay.

At 622, an end button is pressed on the communication device 602. The communication device 602 can inform the multi-party media management controller 600 that a party has ended the session, and at 624, the multi-party media management controller 600 can record the end time and can transmit and END signal to the other communication devices participating in the session.

At 626, the communication device 602 ends the recording function and ends the VoIP session. At 628, the record audio is uploaded to the multi-party media management controller 600. In some embodiments, at 630, the local recording of the audio is automatically deleted by the communication device 602. At 632, the multi-party media management controller 600 receives the audio uploads from all of the communication devices participating in the session. At 634, it is determined if all of the audio files have been uploaded to the multi-party media management controller 600. At 636, the multi-party media management controller 600 determines the synchronization of the recordings based on the rtt_delay values calculated at 620. At 638, a merged recording is produced. It is noted that the merged recording can be generated, produced, processed, or otherwise prepared automatically by the multi-party media management controller 600, without intervention or involvement by a human operator. The merged recording can be disseminated through any suitable technique, such as via an in-app download, as indicated at 640, or via an email with a link to access the download, as indicated at 642. In some embodiments, the merged recording can be available for dissemination less than approximately 1 hour subsequent to the audio files being uploaded to the multi-party media management controller 600. In some embodiments, the merged recording can be available for dissemination less than approximately 30 minutes subsequent to the audio files being uploaded to the multi-party media management controller 600. In some embodiments, the merged recording can be available for dissemination less than approximately 15 minutes subsequent to the audio files being uploaded to the multi-party media management controller 600. In some embodiments, the merged recording can be available for dissemination less than approximately 1 minute subsequent to the audio files being uploaded to the multi-party media management controller 600.

Figure 7:
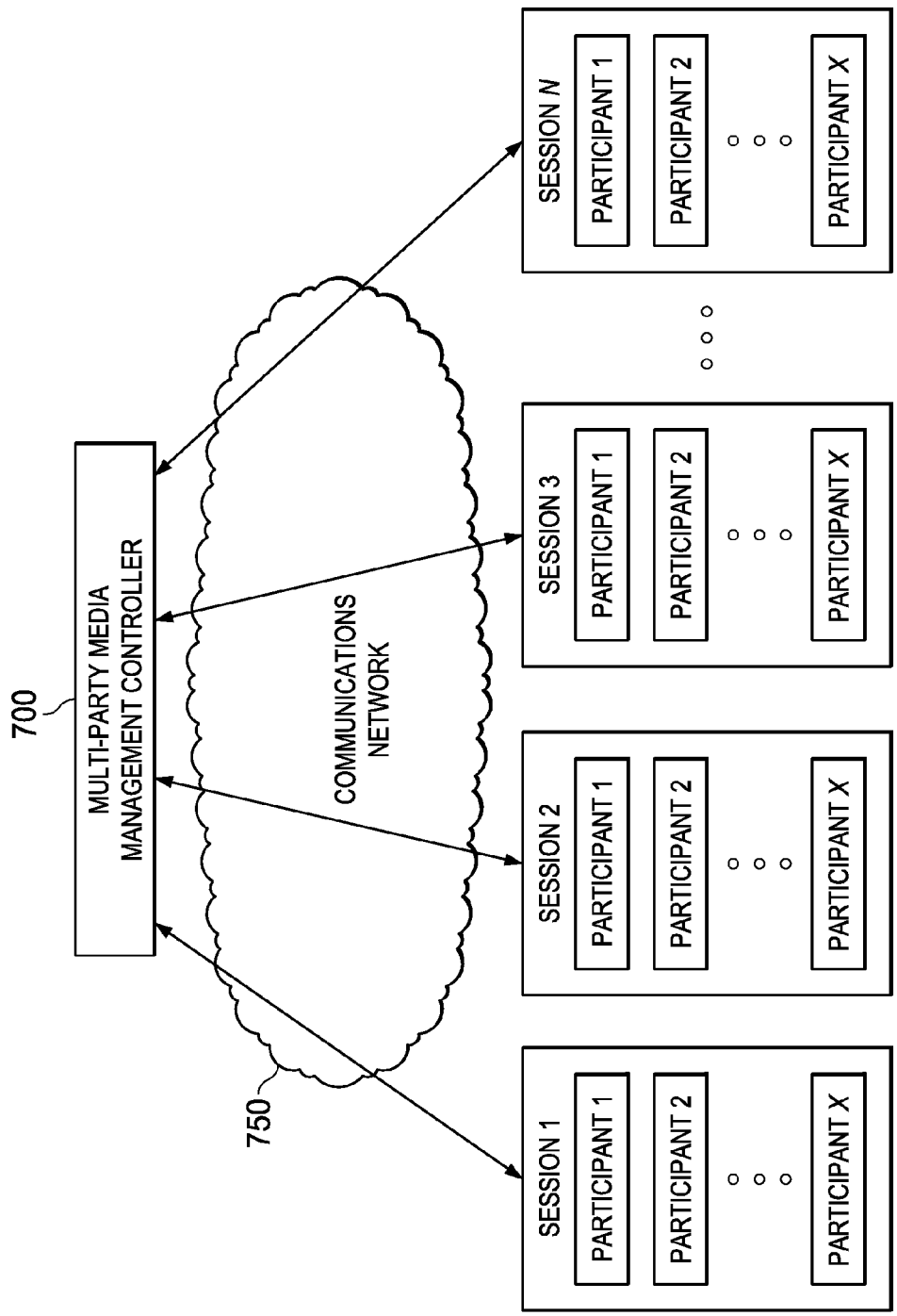
FIG. 7 depicts an example system diagram comprising a multi-party media management controller hosting a plurality of sessions, with each session having two or more participants.

FIG. 7 depicts an example system diagram comprising a multi-party media management controller 700 hosting a plurality of sessions, schematically illustrated as SESSION 1, SESSION 2, SESSION 3 . . . SESSION N, where N is any suitable integer. Each of the SESSIONS 1-N can have any suitable number of participants, schematically illustrated as PARTICIPANT 1, PARTICIPANT 2 . . . PARTICIPANT X, where X is any suitable integer. Each PARTICIPANT 1, PARTICIPANT 2 . . . PARTICIPANT X can interact with respective communications device during the session, as described above. The forms of media received by the multi-party media management controller 700 from each participant via a communications network 750 can vary session to session. For example, the media format for SESSION 1 may be audio only, the media format for SESSION 2 may be video only, and the media format for SESSION 3 may be audio and video. Additionally or alternatively, participants within a particular session can upload differing types of media to the multi-party media management controller 700. For example, PARTICIPANT 1 in SESSION 1 may upload audio only to the multi-party media management controller 700 while PARTICIPANT 2 may upload audio and video to the multi-party media management controller 700. Furthermore, the type of content within a particular media format can differ. For example, PARTICIPANT 1 in SESSION 2 may upload video of a desktop interface or screen-share (i.e., collected during a webinar or video conferencing event) while PARTICIPANT 2 in SESSION 2 may upload different video content (i.e., collected from a webcam or other camera).

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A system, comprising,
a multi-party media management controller in networked communication with a first communication device associated with a first user and a second communication device associated with a second user, the multi-party media management controller is to:
    transmit to each of the first and the second communication devices a start signal to initiate a first local recording session at the first communication device and a second local recording session at the second communication device;
    receive from the first communication device a first media file, wherein the first media file comprises data collected during the first local recording session;
    receive from the second communication device a second media file, wherein the second media file comprises data collected during the second local recording session; and
    form a merged media file comprising a composite of data collected during the first local recording session and data collected during the second local recording session;
wherein subsequent to the transmission of the start signal to each of the first and second communication devices, the multi-party media management controller is to:
    receive from the first communication device a first response message, wherein the first response message identifies an amount of temporal delay between receipt of the start signal by the first communication device and the initiation of the first local recording session; and
    receive from the second communication device a second response message, wherein the second response message identifies an amount of temporal delay between receipt of the start signal by the second communication device and the initiation of the second local recording session.

2. The system of claim 1, wherein the multi-party media management controller is to:
    determine a first estimated temporal delay for the first communication device based on the temporal delay identified in the first response message; and
    determine a second estimated temporal delay for the second communication device based on the temporal delay identified in the second response message.

3. The system of claim 2, wherein the multi-party media management controller is to form the merged media file based on the first estimated temporal delay and the second estimated temporal delay.

4. The system of claim 1, wherein the multi-party media management controller is to:
    host a voice over Internet protocol (VoIP) session between the first communication device and the second communication device during the first and second local recording sessions.

5. The system of claim 4, wherein each of the first media file and second media file comprises digital content encoded at a higher quality level than a quality level of VoIP audio content transmitted between the first communication device and the second communication device during the VoIP session.

6. The system of claim 1, wherein each of the first and second local recording sessions records one or more of audio content and video content.

7. The system of claim 1, wherein the merged media file is an audio file representative of a conversation between the first user and the second user, wherein the audio file is a synchronized composite of the first media file and the second media file.

8. A method of media management at a communication device, comprising:
    initiating by the communication device a voice over Internet protocol (VoIP) session hosted by a multi-party media management controller;
    transmitting by the communication device VoIP audio content to the multi-party media management controller, wherein the VoIP audio content is compressed;
    receiving by the communication device and from the multi-party media management controller a start signal;
    subsequent to receiving the start signal, initiating by the communication device a local recording session, wherein the local recording session creates a media file;
    determining by the communication device an amount of elapsed time between the receipt of the start signal and the initiation of the local recording session;
    transmitting by the communication device to the multi-party media management controller the determined amount of elapsed time; and
    subsequent to the conclusion of the local recording session, transmitting by the communication device the media file to the multi-party media management controller, wherein the media file created during the local recording session comprises audio content encoded at a higher quality level than a quality level of the VoIP audio content transmitted to the multi-party media management controller.

9. The method of claim 8, wherein a microphone of the communication device collects the audio content during the local recording session.

10. The method of claim 8, wherein the media file further comprises video content collected by a camera of the communication device during the local recording session.

11. The method of claim 8, wherein the transmitting by the communication device of the media file to the multi-party media management controller comprises automatically transmitting the media file to the multi-party media management controller without user interaction.

12. The method of claim 8, further comprising:
receiving by the communication device a merged media file created by the multi-party media management controller, wherein the merged media file comprises content from the media file and content from a media file created by one or more other communication devices.

13. The method of claim 12, wherein the merged media file is an audio file representative of a conversation between a user of the communication device and one or more other parties to the conversation through the one or more other communication devices, wherein the audio file is a synchronized composite of the media file and one or more other media files.

14. A computer-based multi-party media management method, comprising:
transmitting, by a multi-party media management controller to each of a first and a second communication devices, a start signal to initiate a first local recording session at the first communication device and a second local recording session at the second communication device;
receiving from the first communication device a first media file, wherein the first media file comprises data from the first local recording session;
receiving from the second communication device a second media file, wherein the second media file comprises data from the second local recording session;
receiving from the first communication device a first response message, wherein the first response message identifies an amount of temporal delay between receipt of the start signal and the initiation of the first local recording session;
receiving from the second communication device a second response message, wherein the second response message identifies an amount of temporal delay between receipt of the start signal and the initiation of the second local recording session; and
forming a merged media file comprising a composite of data collected during the first local recording session and data collected during the second local recording session.

15. The computer-based multi-party media management method of claim 14, further comprising:
determining a first estimated temporal delay for the first communication device based on the temporal delay identified in the first response message; and
determining a second estimated temporal delay for the second communication device based on the temporal delay identified in the second response message.

16. The computer-based multi-party media management method of claim 15, wherein forming the merged media file comprises:
aligning the first media file and the second media file based on the first estimated temporal delay and the second estimated temporal delay to form synchronized composite of the first media file and the second media files, wherein the merged media file represents a session between a user of the first communication device and a user of the second communication device.

* * * * *